(12) United States Patent
Lin et al.

(10) Patent No.: US 11,718,276 B2
(45) Date of Patent: Aug. 8, 2023

(54) DOUBLE-USE NOZZLE ADAPTER

(71) Applicant: Ying-Le Lin, Taichung (TW)

(72) Inventors: Ying-Le Lin, Taichung (TW); Shih-Yao Fang, Taichung (TW)

(73) Assignee: Ying-Le Lin, Taichung (TW)

( * ) Notice: Subject to any disclaimer, the term of this patent is extended or adjusted under 35 U.S.C. 154(b) by 51 days.

(21) Appl. No.: 17/204,606

(22) Filed: Mar. 17, 2021

(65) Prior Publication Data
US 2022/0297640 A1 Sep. 22, 2022

(51) Int. Cl.
B60S 5/04 (2006.01)
B60C 23/00 (2006.01)
F16K 15/20 (2006.01)

(52) U.S. Cl.
CPC .......... B60S 5/04 (2013.01); B60C 23/00354 (2020.05); F16K 15/20 (2013.01); Y10T 137/3724 (2015.04)

(58) Field of Classification Search
CPC .......... B60S 5/04; F16K 31/602; F16K 11/04; F16K 15/207; F16K 1/04; F16K 3/262; F16K 3/267; F16K 15/20; F16K 15/04; Y10T 137/87925–87973; Y10T 137/9023; Y10T 137/87941–87965; Y10T 137/9029; Y10T 137/3724; F16L 37/18; F16L 37/28; F16L 37/1215; F16L 37/32; F16L 17/00; F04B 33/005; B60C 23/06; B60C 23/00354; B60C 23/0496; B60C 29/064
USPC .... 137/614–614.6, 798, 231; 251/149–149.9
See application file for complete search history.

(56) References Cited

U.S. PATENT DOCUMENTS

| 6,105,600 A * | 8/2000 | Wang | B60S 5/04 137/231 |
| 6,146,116 A * | 11/2000 | Wu | F04B 33/005 137/231 |
| 7,028,711 B1 * | 4/2006 | Scott | F16L 37/44 251/149.9 |
| 7,032,613 B2 * | 4/2006 | Delorme | F04B 33/005 137/231 |

(Continued)

FOREIGN PATENT DOCUMENTS

TW    I498479 B    9/2015
TW    I544147 B  *  1/2016

Primary Examiner — Craig J Price
(74) Attorney, Agent, or Firm — Muncy, Geissler, Olds & Lowe, P.C.

(57) ABSTRACT

A double-use nozzle adapter includes a main body, a switch unit, and a needle unit. The switch unit includes a shifting member and two rigid retaining members. The rigid retaining members are arranged between the shifting member and the main body. The shifting member shifts the rigid retaining member between a first position and a second position. The needle unit is slidably installed in the main body and includes a needle. In the first position, the shifting member drives the rigid retaining member to press against the needle, thereby preventing the needle from moving with respect to the main body and making the needle connectable to a Schrader valve. In the second position, the rigid retaining member moves between the shifting member and the main body, so as to allow the needle to move with respect to the main body and make the needle connectable to a Presta valve.

8 Claims, 9 Drawing Sheets

(56) References Cited

U.S. PATENT DOCUMENTS

| | | | | |
|---|---|---|---|---|
| 8,408,235 B2* | 4/2013 | Wu | ............... | F04B 33/005 |
| | | | | 417/469 |
| 9,206,916 B1* | 12/2015 | Wang | ............... | F04B 33/00 |
| 9,989,179 B2* | 6/2018 | Wang | ............... | F04B 33/00 |
| 2005/0000568 A1* | 1/2005 | Nikolayev | ............... | F16L 37/23 |
| | | | | 137/231 |
| 2013/0291976 A1* | 11/2013 | Chang | ............... | F16L 41/021 |
| | | | | 137/798 |
| 2014/0326345 A1* | 11/2014 | Kuo | ............... | F16L 37/28 |
| | | | | 137/798 |
| 2015/0298516 A1* | 10/2015 | Purisch | ............... | F04B 33/005 |
| | | | | 137/231 |
| 2017/0009922 A1* | 1/2017 | Hsu | ............... | B60C 29/06 |
| 2018/0172167 A1* | 6/2018 | Kuo | ............... | F16K 15/20 |

* cited by examiner

DOUBLE-USE NOZZLE ADAPTER

BACKGROUND OF THE INVENTION

1. Technical Field

The present invention relates to a nozzle adapter, and more particularly to a double-use nozzle adapter.

2. Description of Related Art

Double-use adapters adapt a single inflator to both Schrader and Presta valves on, for example, bicycle tires, thereby facilitating tire inflation.

Taiwan Patent No. 1498479 discloses a joint structure of an air nozzle for dual-purpose, which is designed to work with both Schrader and Presta nozzles for inflation. The known device primarily includes a main body, limit blocks, a control unit, a retaining rod, and springs. The main body has its one end provided with a Schrader socket and a Presta socket. The Presta socket has an outer diameter smaller that of the Schrader socket. The limit blocks are provided on the outer periphery of the main body and passes through the main body from outside. The control unit is rotatably installed on the main body and controls the limit blocks to prevent a Presta valve from entering or leaving the Presta socket. The retaining rod is slidably installed within the main body. The retaining rod is configured to move when pushed by a Presta valve. The spring is arranged between the main body and the retaining rod.

The main body of the known device is provided with a slide rail for a sliding member of the control unit to slide therein. When the sliding member leaves the slide rail, the control unit can be rotated to control the displacement of the limiting ends of the limit blocks. In use, to have the nozzle adapter working with a Schrader valve, before the Schrader valve is connected to the main body, a user has to first push the control unit forward to make the limit blocks retained by the control unit and thereby prevent the retaining rod from displacement. At this time, the limiting end is retained in a retaining recess, and this fixes the retaining rod, so that the Schrader valve can be pushed open by a pressing end of the retaining rod, allowing the Schrader valve to receive delivered air. The nozzle adapter can also work with a Presta valve for inflation. But after the foregoing operation, the retaining rod is now limited by the control unit and prevents the Presta valve from entering the main body. To address this, the user has to push the control unit backward first to allow the retaining rod to be pushed backward by the Presta valve and allow the main body to be connected to the Presta valve. Afterward, the control unit has to be pushed forward to have the limiting ends of the limit blocks retained by the control unit, thereby preventing the engaging teeth from leaving threads on the Presta valve. Not until now the can the Presta valve be fixed in a screwed manner for subsequent inflation. It is evident that the operation for switching between use modes is far from easy and convenient with the prior-art device.

Besides, the prior-art device requires two limit blocks and two push springs to provide the required pushing effect that allows the foregoing switching. Each of the limit blocks has to be provided with the engaging teeth through additional processing and during fabrication the push springs and the limit blocks need to be carefully placed in the through holes of the main body or the limit blocks may jump out of the through holes due to their resilience. All these make the prior-art device complicated in structure and time-consuming to fabricate.

SUMMARY OF THE INVENTION

To address the shortcomings of the prior art, the present invention discloses a double-use nozzle adapter having advantages of easy operation, simple structure, and ready fabrication by virtue of its configuration in which a switch unit is configured to be easily rotate to make rigid retaining members engage or release a needle, thereby allowing the main body to be connected to a Schrader valve or a Presta valve.

To achieve the fore foregoing objective, in one embodiment, the present invention provides a double-use nozzle adapter, which includes a main body, a switch unit and a needle unit. The main body has a first end and a second end opposite to the first end along a first axis. The first end has a vent, and the second end has a first threaded hole and a second threaded hole that are made coaxial to each other. The second threaded hole and vent are communicated through an action chamber located therebetween. The main body has two through holes. The switch unit is rotatably mounted around an outer periphery of the main body. The switch unit includes a shifting member and two rigid retaining members. The rigid retaining member is arranged between the shifting member and the main body. The shifting member makes the rigid retaining member shift between a first position and a second position. The needle unit is slidably installed in the action chamber of the main body. The needle unit includes a needle. In the first position, the shifting member drives the rigid retaining member to press against the needle, thereby preventing the needle form moving with respect to the main body and making the needle and the first threaded hole connectable to a Schrader valve. In the second position, the rigid retaining member is movable between the shifting member and the main body along a direction of a second axis perpendicular to the first axis to make the needle move with respect to the main body, thereby making the needle and the second threaded hole connectable to a Presta valve.

With the configuration described previously, a user can operate the shifting member with a simple rotation gesture to make the rigid retaining member engage or release the needle, thereby allowing the main body to fit a Schrader valve or a Presta valve for inflation depending on the position of the needle.

DETAILED DESCRIPTION OF THE INVENTION

Figure 1:
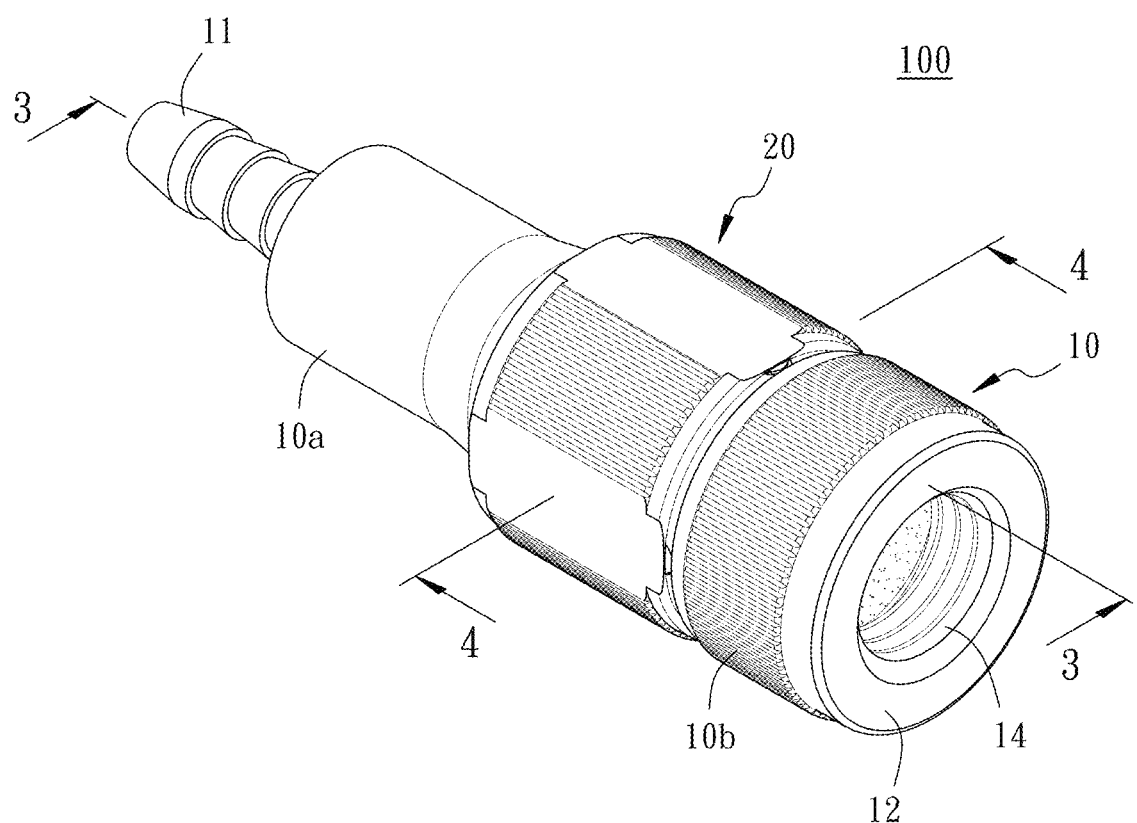
FIG. 1 is a schematic perspective view of a double-use nozzle adapter according to a first embodiment of the present invention.
Figure 2:
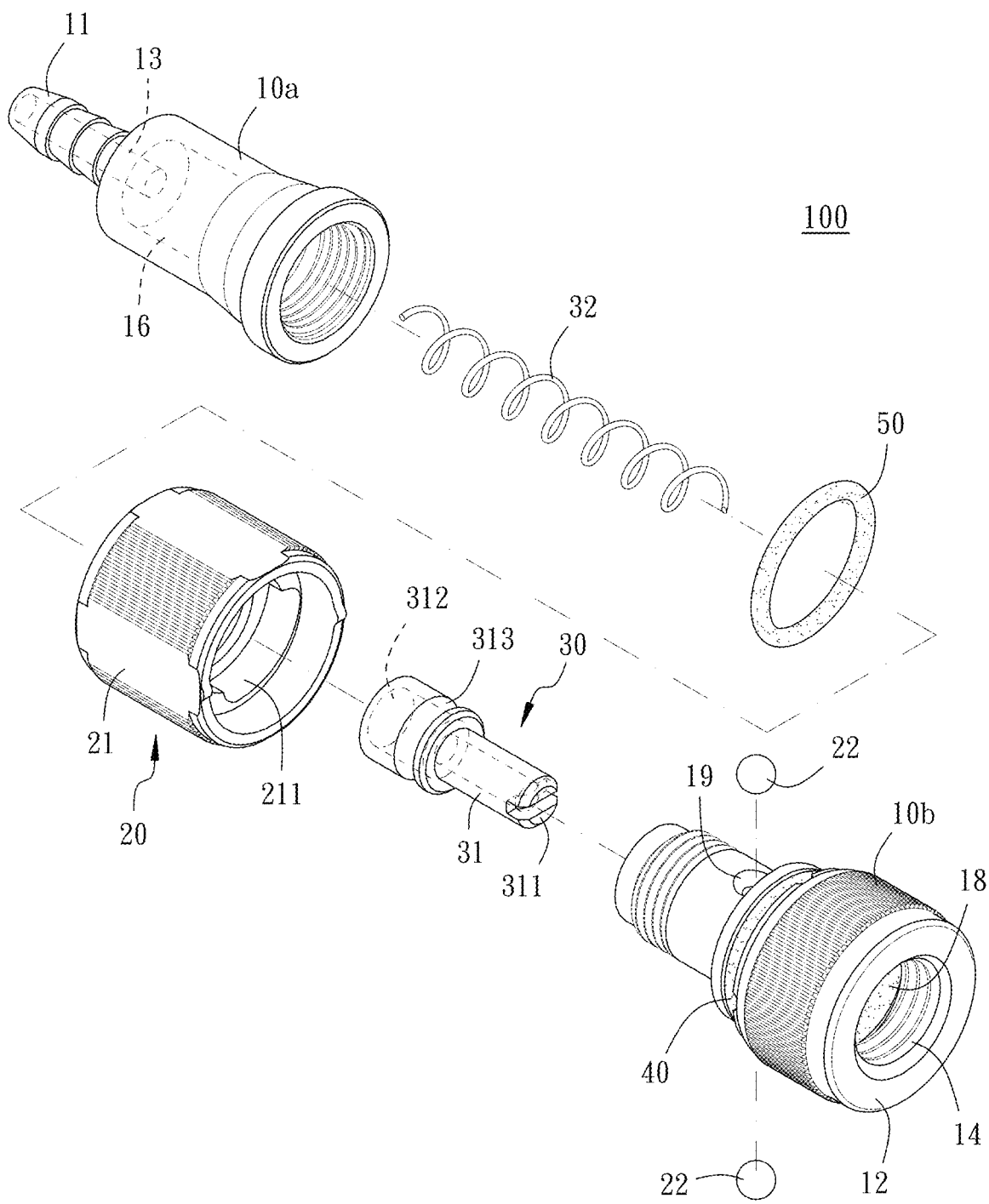
FIG. 2 is a schematic exploded view of the double-use nozzle adapter of FIG. 1.
Figure 3:
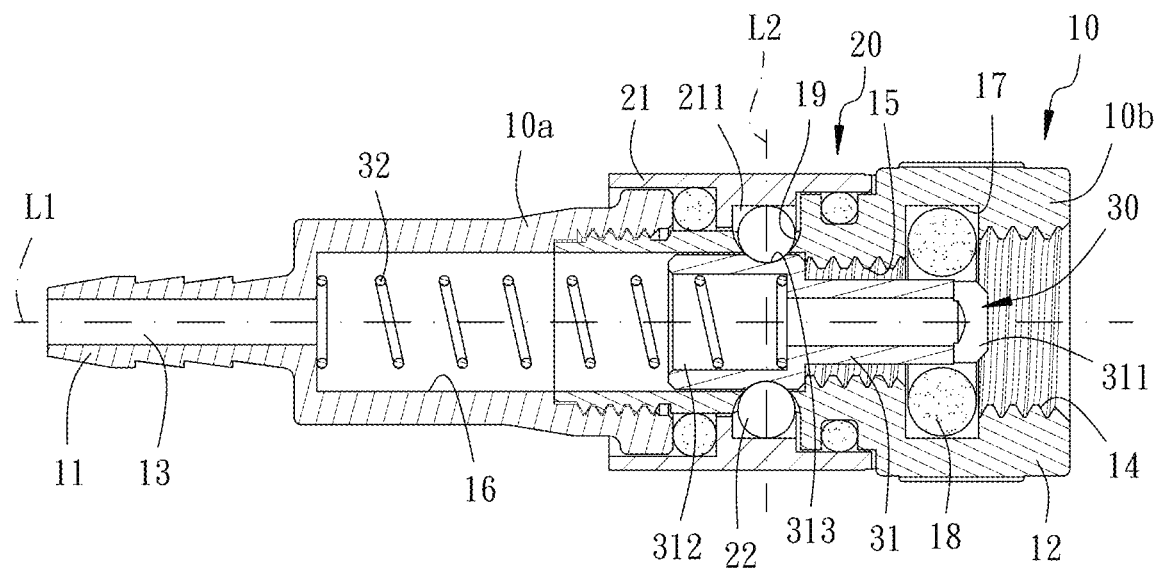
FIG. 3 is a schematic cross-sectional view of the double-use nozzle adapter taken along Line 3-3 of FIG. 1.

Referring to FIG. 1 through FIG. 7, in the first embodiment of the present invention, a double-use nozzle adapter 100 includes a main body 10, a switch unit 20, and a needle unit 30. The needle unit 30 is installed within the main body 10 and controlled by the switch unit 20 to make the main body 10 connectable to a Schrader valve 1 or a Presta valve 2.

The main body 10 has a first end 11 and a second end 12 opposite to the first end 11 along a first axis L1. The first end 11 has a vent 13 communicated to an external pressurized air source (such as an air pump). The second end 12 has a first threaded hole 14 and a second threaded hole 15 that are made coaxial to each other. The second threaded hole 15 and the vent 13 are communicated to each other through an action chamber 16 located therebetween. The first threaded hole 14 has an inner diameter greater than the inner diameter of the second threaded hole 15, and the second threaded hole 15 is located between the first threaded hole 14 and the action chamber 16. Furthermore, an annular recess 17 is formed between the first threaded hole 14 and the second threaded hole 15 for accommodating a seal ring 18. Therein, the first threaded hole 14 is configured to work with a Schrader valve 1, and the second threaded hole 15 is configured to work with a Presta valve 2.

In the present invention embodiment, the main body 10 includes a connector 10a and an attachment 10b. The attachment 10b is configured to attached to the connector 10a by means of, for example, screwed connection. The first end 11 is formed on the connector 10a, and the second end 12 is formed on the attachment 10b. The action chamber 16 is located between the attachment 10b and the connector 10a. Furthermore, the attachment 10b of the main body 10 has an outer periphery provided with two through holes 19. The two through holes 19 are apart from each other along the outer periphery of the attachment 10b by 180 degrees, and each of the through holes 19 is a circular hole that includes a large-diameter end 191 and a small-diameter end 192.

The switch unit 20 is rotatably mounted around the outer periphery of the main body 10. The switch unit 20 includes a shifting member 21 and two rigid retaining members 22. The shifting member 21 has one end mounted around where the attachment 10b and the connector 10a overlap and has an opposite end mounted around the attachment 10b. The rigid retaining member 22 is such arranged between the shifting member 21 and the main body 10 that it corresponds to the outer periphery of the attachment 10b. The shifting member 21 is configured to make the rigid retaining member 22 move between a first position and a second position.

Figure 4:
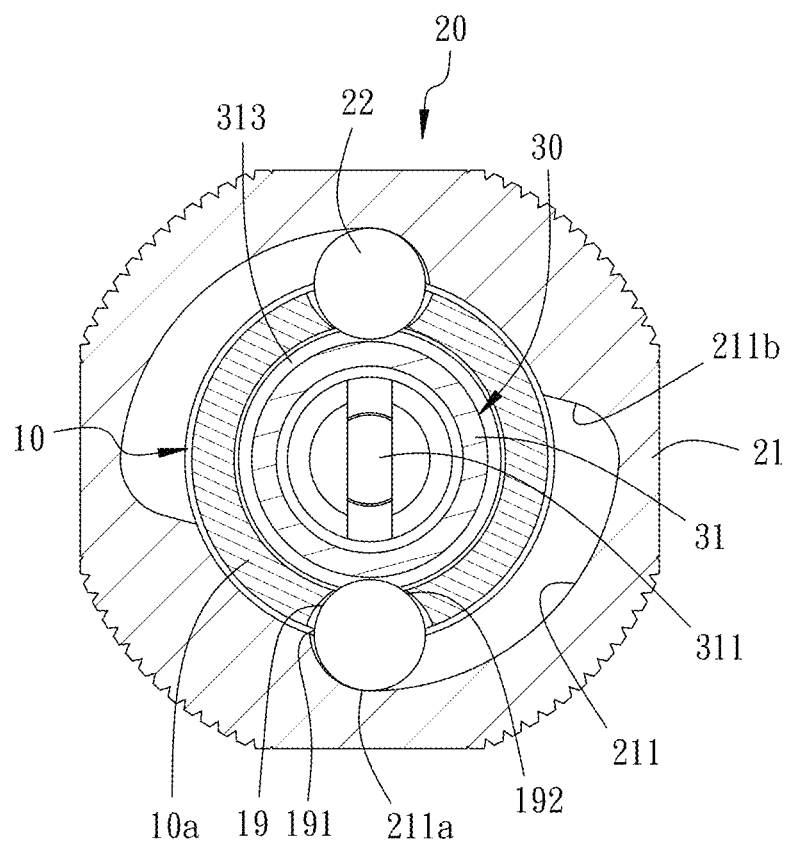
FIG. 4 is a schematic cross-sectional view of the double-use nozzle adapter taken along Line 4-4 of FIG. 1, showing a rigid retaining member set in its first position.
Figure 6:
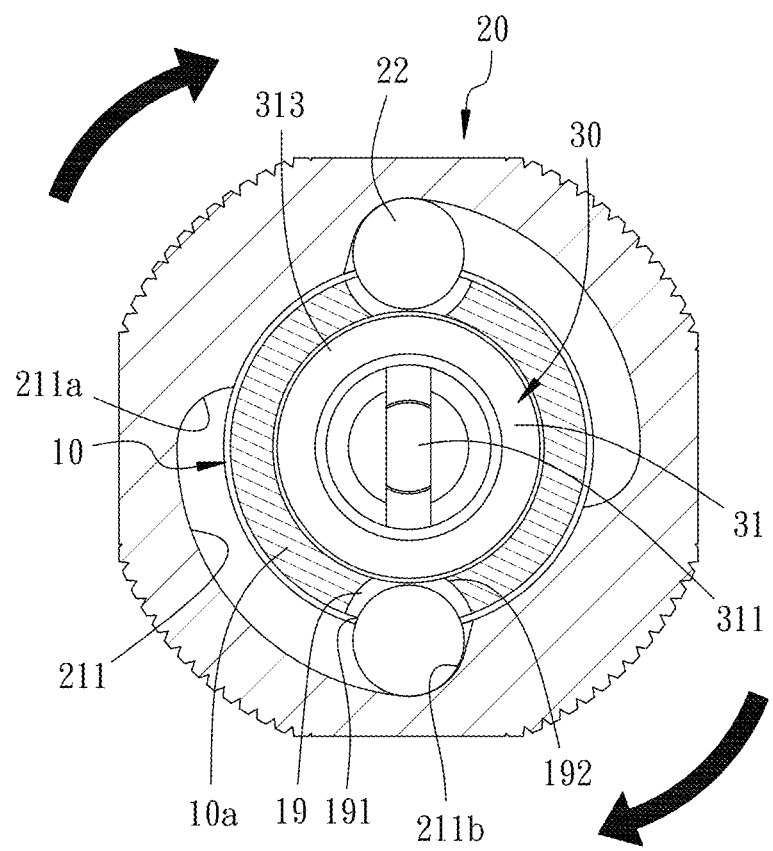
FIG. 6 is a transverse cross-sectional view of the double-use nozzle adapter, showing the rigid retaining member set in its second position.

As shown in FIG. 4 and FIG. 6, in the present invention embodiment, the shifting member 21 has two shifting grooves 211 that are curved to fit the outer periphery of the main body 10. The through holes 19 have their large-diameter ends 191 facing the shifting grooves 211, respectively. The rigid retaining member 22 is herein realized by two steel balls configured to be received in the shifting grooves 211, respectively. Each of the shifting grooves 211 defines a first groove end 211a and a second groove end 211b. The first groove end 211a and the second groove end 211b are each formed with an arched profile. The first groove end 211a has a radial depth smaller than the radial depth of the second groove end 211b. The two steel balls, as the rigid retaining member 22, when pushed by the shifting member 21, pass through the respective through holes 19 and press against the needle unit 30.

The needle unit 30 is slidably installed in the action chamber 16 of the main body 10. The needle unit 30 includes a needle 31 and a returning member 32. The needle 31 has a hollow body allowing air to pass therethrough. One end of the needle 31 is an inflating end 311, while the other end is formed as a socket 312. The inflating end 311 is configured to be connected to a Schrader valve 1, while the returning member 32 is a spring, which has one end pressing against the bottom of the action chamber 16 and an opposite end pressing against the socket 312. In other words, the returning member 32 is received in the action chamber 16 and prop between the connector 10a and the needle 31, so as to normally bias the needle 31 toward the second end 12 of the main body 10. Therein, the needle 31 has an outer periphery formed with a circular positioning groove 313 positionally corresponding to the through holes 19. The positioning groove 313 has a depth that is smaller than one half of the height of each of the two steel balls, or the rigid retaining member 22. The foregoing through holes 19 have their small-diameter ends 192 facing the positioning groove 313.

Figure 5:
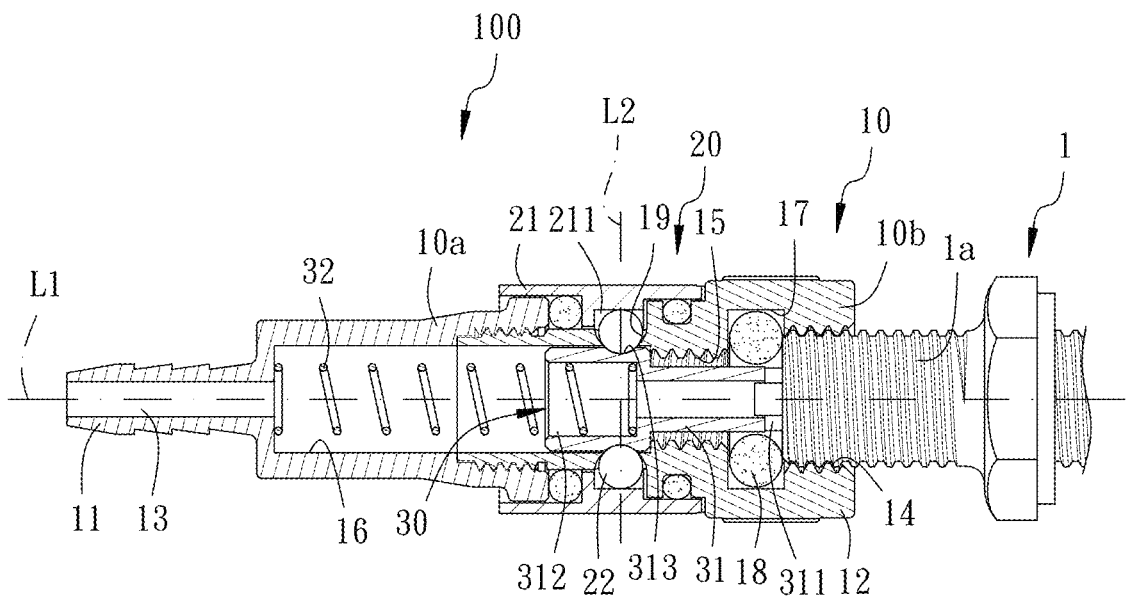
FIG. 5 is an applied cross-sectional view of the double-use nozzle adapter that is now connected to a Schrader valve.

As shown in FIG. 4 and FIG. 5, when the two steel balls of the rigid retaining member 22 are in the first position, they are tightly sandwiched between the first groove end 211a and the positioning groove 313. At this time, the steel balls pushed by the bottom of the shifting groove 211 of the shifting member 21 is forced to pass through the through holes 19 and press against the bottom of the positioning groove 313 of the needle 31, thereby preventing the needle 31 from moving with respect to the main body 10. This allows a Schrader valve 1 to be connected to the attachment 10b of the main body 10 in the direction of the first axis L1, with the threaded portion 1a of the Schrader valve 1 screwedly connected into the first threaded hole 14. Since the needle 31 is now retained from retracing, the inflating end 311 of the needle 31 can well combined with the Schrader valve 1 to deliver air.

Figure 7:
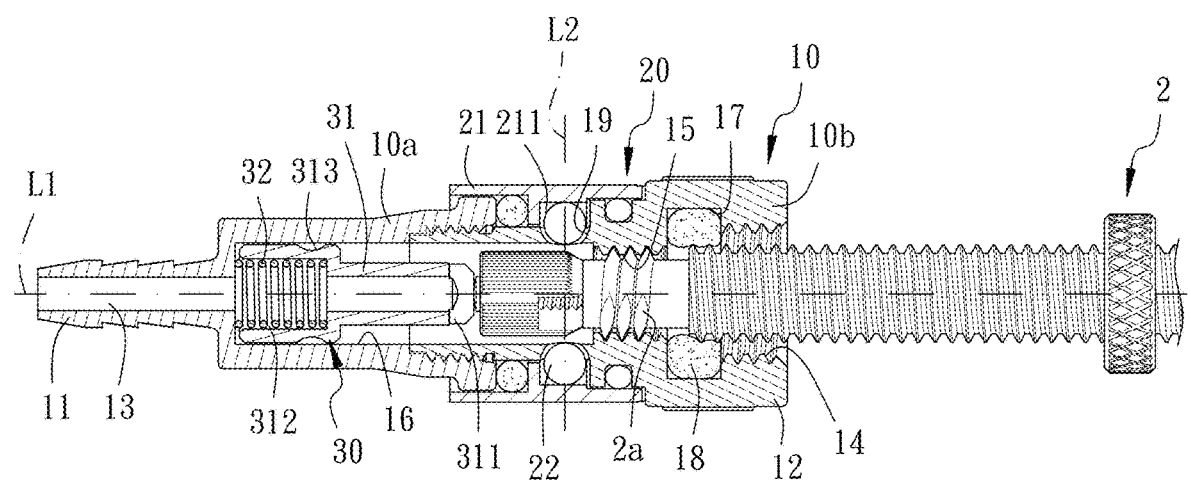
FIG. 7 is an applied cross-sectional view of the double-use nozzle adapter that is now connected to a Presta valve.

As shown in FIG. 6 and FIG. 7, by manually rotating the shifting member 21 with respect to the main body 10, the rigid retaining member 22 can be set in the second position. Since the radial depth of the first groove end 211a is smaller than that of the second groove end 211b, a margin is provided between the shifting member 21 and the attachment 10b of the main body 10 so that the steel balls 22 are allowed to move between the shifting member 21 and the main body 10 along a direction of a second axis L2 that is perpendicular to the first axis L1. This means that the steel balls 22 are now movable at the second groove ends 211b of the shifting grooves 211 to leave their respective through holes 19. As a result, the needle 31 is released by the rigid retaining member 22 and allowed to move with respect to the main body 10. In this state, when a Presta valve 2 is combined with the main body 10, the Presta valve 2 entering the main body 10 pushes the needle 31 toward the first end 11, so that the Presta valve 2 can reach to the attachment 10b of the main body 10 in the direction of the first axis L1 and have its threaded portion 2a screwed into the second threaded hole 15. At this time, the inflating end 311 of the needle 31 connected to the Presta valve 2 is ready to deliver air to the Presta valve 2. It is to be noted that when the rigid retaining member 22 is in the second position, the threaded portion 2a of the Presta valve 2 can directly be screwed into the second threaded hole 15 to connect the Presta valve 2 to the main body 10 for subsequent inflation, without any additional manual operation of the shifting member 21. Therein, when the needle 31 moves toward the first end 11, the returning member 32 is compressed and when the Presta valve 2 leaves the main body 10, the returning member 32 uses its resilience to return the needle 31 to its initial position.

In another embodiment of the present invention, the shifting member 21 further comprises a first O-ring 40 and a second O-ring 50 mounted around the outer periphery of the attachment 10b of the main body 10 so as to be located at two sides of the shifting grooves 211, with the first O-ring 40 positionally corresponding to the outside of the second threaded hole 15.

With the configuration described previously, the present invention is simple in structure and easy to operate. Specifically, a user can operate the shifting member 21 with a simple rotation gesture to make the rigid retaining member 22 engage or release the needle 31, thereby allowing the main body 10 to fit a Schrader valve 1 or a Presta valve 2 for inflation depending on the position of the needle 31. Hence, the present invention is less structurally complicated as compared to any conventional devices providing the same function.

Additionally, when the rigid retaining member 22 is in the first position, a Schrader valve 1 can be connected to the main body 10, and when the rigid retaining member 22 is in the second position, a Presta valve 2 can be inserted to get connected to the main body 10. The invention is convenient and effortless to use and thus surpasses the prior-art device that requires multi-step operation to function, making the present invention highly valuable.

Figure 8:
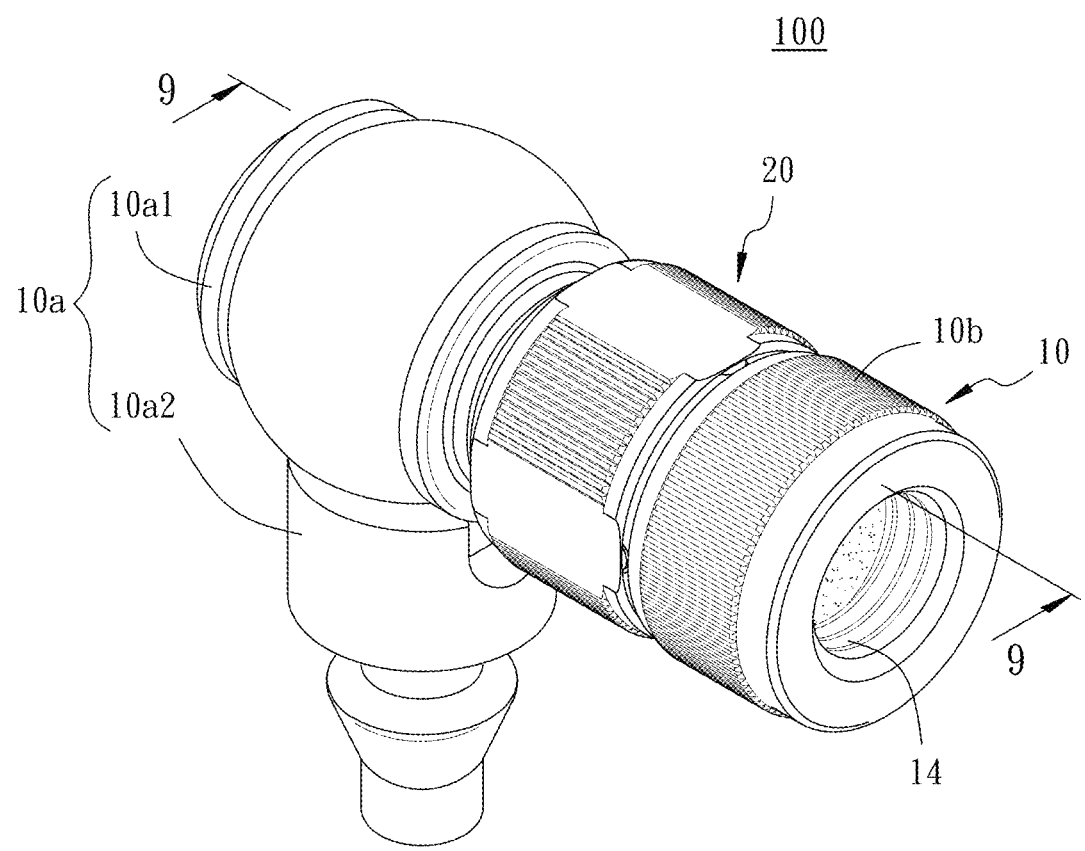
FIG. 8 is a schematic perspective view of a double-use nozzle adapter according to a second embodiment of the present invention.
Figure 9:
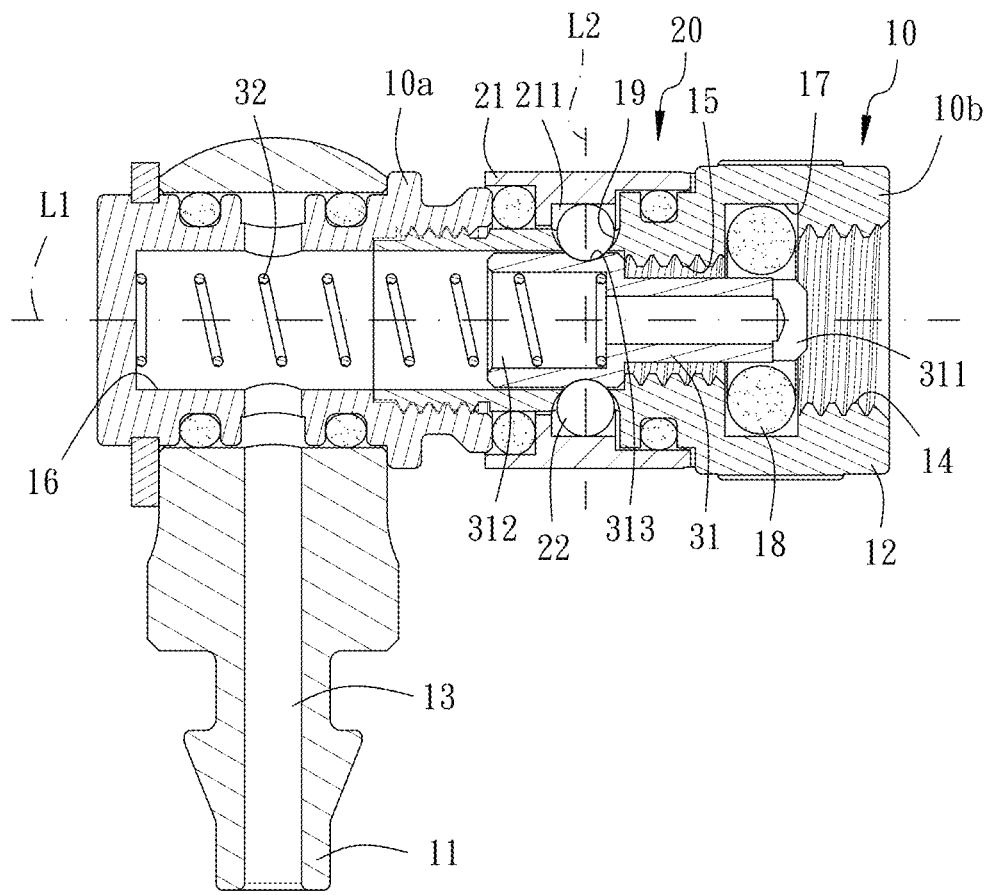
FIG. 9 is a schematic cross-sectional view of the double-use nozzle adapter of FIG. 8.

FIG. 8 and FIG. 9 depict a double-use nozzle adapter 100 according to the second embodiment of the present invention. Therein, a connector 10a of a main body 10 includes a connecting section 10a1 and a vertical section 10a2. The connecting section 10a1 is linked to an attachment 10b. An action chamber 16 is located between the attachment 10b and the connecting section 10a1. The vertical section 10a2 is vertically connected to the connecting section 10a1. A vent 13 is provided on the vertical section 10a2. The main body 10 such configured has an alternative form for convenient use.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A double-use nozzle adapter, comprising:
a main body, defining a first end and a second end opposite to the first end along a first axis, the first end having a vent, the second end having a first threaded hole and a second threaded hole that are made coaxial to each other, the second threaded hole and the vent being communicated through an action chamber located therebetween, and the main body having two through holes;
a switch unit, being rotatably mounted around an outer periphery of the main body, the switch unit including a shifting member and two rigid retaining members, each of the rigid retaining members being located between the shifting member and the main body, the shifting member shifting each of the rigid retaining members between a first position and a second position, the shifting member having two shifting grooves, and each of the two rigid retaining members being received in a respective groove of said two shifting grooves, so that when each of the rigid retaining members is in the first position, each of said respective groove of said two shifting grooves makes each of the rigid retaining members pressing against a needle, and when each of the rigid retaining members is in the second position, each of the rigid retaining members is allowed to move in said respective groove of said two shifting grooves, wherein each of said two shifting grooves is curved to fit the outer periphery of the main body and defines a first groove end and a second groove end, in which the first groove end has a radial depth that is smaller than a radial depth of the second groove end, and each of the rigid retaining members passes through one of the through holes of the main body, respectively; and
a needle unit, being slidably installed in the action chamber of the main body and including the needle, in which when each of the rigid retaining members is in the first position, the shifting member drives each of the rigid retaining members to press against the needle, thereby preventing the needle from moving with respect to the main body and making the needle and the first threaded hole connectable to a Schrader valve, and when each of the rigid retaining members is in the second position, each of the rigid retaining members is movable between the shifting member and the main body along a direction of a second axis that is perpendicular to the first axis, so that the needle is allowed to move with respect to the main body and make the needle and the second threaded hole connectable to a Presta valve, wherein the needle has an outer periphery provided with a positioning groove that is positionally corresponding to each of the through holes, so that when each of the rigid retaining members is in the first position, each of the rigid retaining members is tightly sandwiched between one of the first groove ends and the positioning groove, and when each of the rigid retaining members is in the second position, each of the rigid retaining members is moveable at one of the second groove end to leave the corresponding through hole.

2. The double-use nozzle adapter of claim 1, wherein the first groove end and the second groove end are each formed with an arched profile, and the positioning groove is formed with the arched profile.

3. The double-use nozzle adapter of claim 2, wherein each of the through holes is a circular hole having a large-diameter end and a small-diameter end, in which the small-diameter end faces the positioning groove and the large-diameter end faces the shifting groove.

4. The double-use nozzle adapter of claim 3, wherein each of the rigid retaining members is a steel ball, in which the positioning groove has a depth that is smaller than one half of a height of the steel ball.

5. The double-use nozzle adapter of claim 1, wherein the main body includes a connector and an attachment linked to the connector, the shifting member having one end mounted around where the attachment and the connector overlap and an opposite end mounted around the attachment, the first end being on the connector, and the second end being on the attachment, the action chamber being located between the attachment and the connector; the first threaded hole having an inner diameter greater than an inner diameter of the second threaded hole, the second threaded hole being located between the first threaded hole and the action chamber; and the needle unit further including a returning member that is installed in the action chamber and propping between the connector and the needle.

6. The double-use nozzle adapter of claim 5, wherein each of the through holes is formed on the attachment, and the shifting member further comprises a first O-ring and a second O-ring mounted around the outer periphery of an attachment of the main body so as to be located at two sides of said two shifting grooves, with the first O-ring positionally corresponding to the outside of the second threaded hole.

7. The double-use nozzle adapter of claim 6, wherein an annular recess is provided between the first threaded hole and the second threaded hole for accommodating a seal ring.

8. The double-use nozzle adapter of claim 5, wherein the connector includes a connecting section and a vertical section, the connecting section being linked to the attachment, the action chamber being located between the attachment and the connecting section, the vertical section being vertically connected to the connecting section, and the vent being formed on the vertical section.

\* \* \* \* \*